(12) United States Patent
Verma et al.

(10) Patent No.: US 10,871,367 B2
(45) Date of Patent: Dec. 22, 2020

(54) SUBSTRATE, METROLOGY APPARATUS AND ASSOCIATED METHODS FOR A LITHOGRAPHIC PROCESS

(71) Applicant: ASML NETHERLANDS B.V., Veldhoven (NL)

(72) Inventors: Alok Verma, Eindhoven (NL); Hugo Augustinus Joseph Cramer, Eindhoven (NL); Thomas Theeuwes, Veldhoven (NL); Anagnostis Tsiatmas, Eindhoven (NL); Bert Verstraeten, Lommel (BE)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 16/882,977

(22) Filed: May 26, 2020

(65) Prior Publication Data

US 2020/0284578 A1 Sep. 10, 2020

Related U.S. Application Data

(62) Division of application No. 16/105,013, filed on Aug. 20, 2018, now Pat. No. 10,677,589.

(30) Foreign Application Priority Data

Aug. 28, 2017 (EP) ..................................... 17188175

(51) Int. Cl.
*G06F 17/50* (2006.01)
*G01B 11/00* (2006.01)
(Continued)

(52) U.S. Cl.
CPC ........... *G01B 11/272* (2013.01); *G01N 21/55* (2013.01); *G03F 7/70466* (2013.01);
(Continued)

(58) Field of Classification Search
CPC .. G01B 11/272; G01B 2210/56; G01N 21/55; G03F 7/70466; G03F 7/70683;
(Continued)

(56) References Cited

U.S. PATENT DOCUMENTS

| 4,225,240 A | 9/1980 | Balasubramanian |
| 4,643,517 A * | 2/1987 | Ruger .................. G01C 11/025 |
| | | 359/199.1 |

(Continued)

FOREIGN PATENT DOCUMENTS

| GB | 2277148 | 10/1994 |
| WO | 2009/078708 | 6/2009 |

(Continued)

OTHER PUBLICATIONS

Gunay-Demirkol, Anil et al.: "Innovative scatterometry approach for Self-Aligned Quadruple Patterning (SAQP) process control", Proceedings of SPIE, vol. 9778, Jun. 6, 2016, pp. 977807-01-977807-12.

(Continued)

*Primary Examiner* — Phallaka Kik
(74) *Attorney, Agent, or Firm* — Pillsbury Winthrop Shaw Pittman LLP

(57) ABSTRACT

A substrate having a plurality of features for use in measuring a parameter of a device manufacturing process and associated methods and apparatus. The measurement is by illumination of the features with measurement radiation from an optical apparatus and detecting a signal arising from interaction between the measurement radiation and the features. The plurality of features include first features distributed in a periodic fashion at a first pitch, and second features distributed in a periodic fashion at a second pitch, wherein the first pitch and second pitch are such that a combined (Continued)

pitch of the first and second features is constant irrespective of the presence of pitch walk in the plurality of features.

20 Claims, 10 Drawing Sheets

(51) Int. Cl.

| | | |
|---|---|---|
| *G01N 21/55* | (2014.01) | |
| *G03F 7/00* | (2006.01) | |
| *H01L 23/58* | (2006.01) | |
| *H01L 29/10* | (2006.01) | |
| *G01B 11/27* | (2006.01) | |
| *G03F 7/20* | (2006.01) | |
| *G06F 30/398* | (2020.01) | |
| *G06F 30/367* | (2020.01) | |
| *G06F 30/3308* | (2020.01) | |
| *G06F 119/18* | (2020.01) | |

(52) U.S. Cl.
CPC ...... *G03F 7/70616* (2013.01); *G03F 7/70633* (2013.01); *G03F 7/70683* (2013.01); *G06F 30/398* (2020.01); *H01L 23/58* (2013.01); *H01L 29/10* (2013.01); *G01B 2210/56* (2013.01); *G06F 30/3308* (2020.01); *G06F 30/367* (2020.01); *G06F 2119/18* (2020.01)

(58) Field of Classification Search
CPC ............. G03F 7/70633; G03F 7/70616; G06F 30/398; G06F 30/3308; G06F 2119/18; H01L 29/10
USPC ................................ 716/54, 55, 136; 257/48
See application file for complete search history.

(56) References Cited

U.S. PATENT DOCUMENTS

| | | | |
|---|---|---|---|
| 4,737,823 A | 4/1988 | Bouwer et al. | |
| 5,416,589 A | 5/1995 | Lysogorski | |
| 10,677,589 B2* | 6/2020 | Verma | G03F 7/70633 |
| 10,747,122 B2* | 8/2020 | Tsiatmas | G01N 21/4788 |
| 2005/0126905 A1* | 6/2005 | Golovchenko | B81C 99/0065 |
| | | | 204/192.34 |
| 2006/0066855 A1 | 3/2006 | Boef et al. | |
| 2009/0040506 A1 | 2/2009 | Naor et al. | |
| 2009/0168062 A1 | 7/2009 | Straaijer | |
| 2009/0262332 A1 | 10/2009 | Xu et al. | |
| 2010/0113941 A1 | 5/2010 | Hendriks et al. | |
| 2011/0027704 A1 | 2/2011 | Cramer et al. | |
| 2011/0134419 A1 | 6/2011 | Fuchs et al. | |
| 2014/0028993 A1* | 1/2014 | Brill | G03F 7/70641 |
| | | | 355/77 |
| 2015/0138534 A1 | 5/2015 | Tidhar | |
| 2015/0176985 A1* | 6/2015 | Shchegrov | H01L 22/30 |
| | | | 356/614 |
| 2015/0204729 A1 | 7/2015 | Kusunose et al. | |
| 2015/0268164 A1 | 9/2015 | Amir | |
| 2016/0117847 A1 | 4/2016 | Pandev et al. | |
| 2017/0001384 A1 | 1/2017 | Eitzinger et al. | |
| 2017/0176870 A1* | 6/2017 | Hinnen | G03F 7/70683 |

FOREIGN PATENT DOCUMENTS

| | | |
|---|---|---|
| WO | 2009/106279 | 9/2009 |
| WO | 2010/076254 | 7/2010 |
| WO | 2015/082158 | 6/2015 |

OTHER PUBLICATIONS

Chao, Robin et al.: "Advanced in-Line Metrology Strategy for Self-Aligned Quadruple Patterning", Proceedings of SPIE, vol. 9778, Jun. 6, 2016, pp. 977813-1-977813-10.

Jongsu, Lee et al: "Spacer multi-patterning control strategy with optical CD metrology on device structures", Proceedings of SPIE, vol. 9778, Jun. 6, 2016, pp. 97782B-1-97782B-11.

International Search Report issued in corresponding PCT Patent Application No. PCT/EP2018/071418, dated Sep. 6, 2018.

Taiwanese Office Action issued in corresponding Taiwanese Patent Application No. 107129883, dated Apr. 25, 2019.

\* cited by examiner

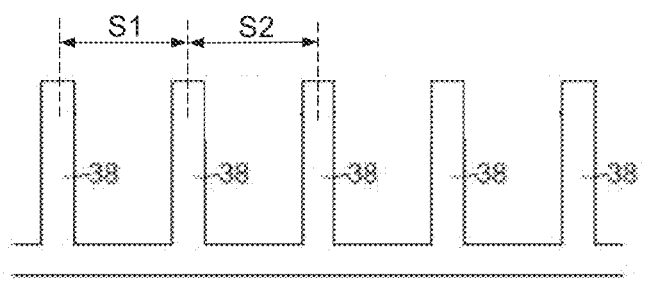
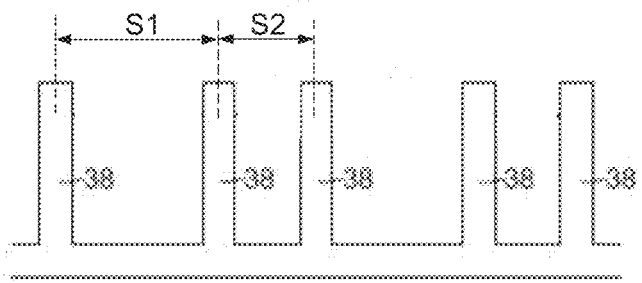

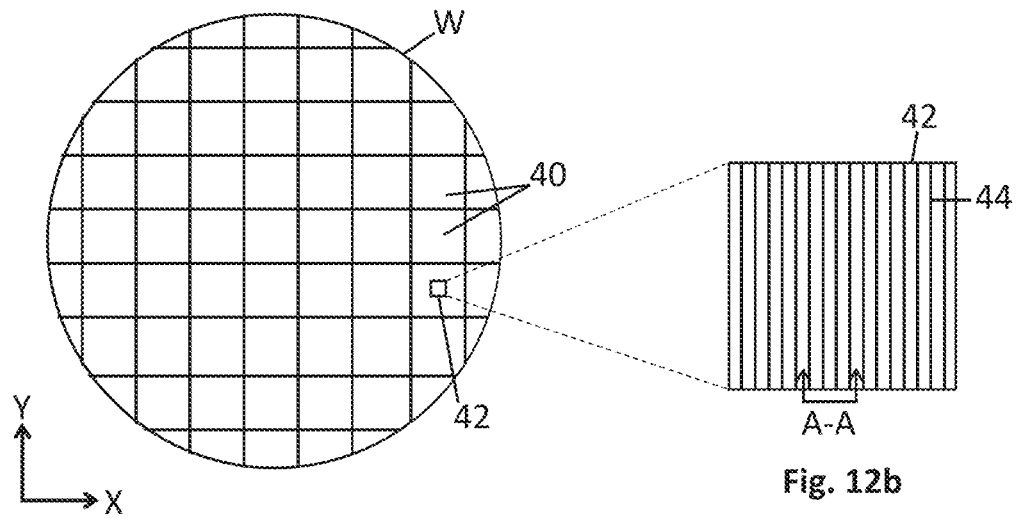
Fig. 12a
Fig. 12b
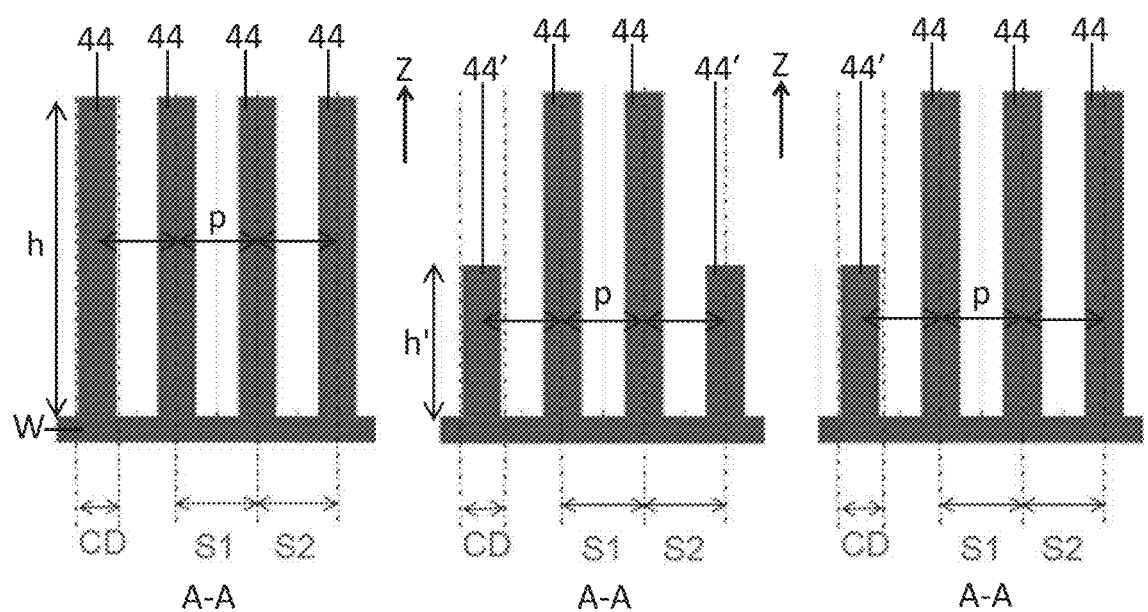
Fig. 13a
Fig. 13b
Fig. 13c

SUBSTRATE, METROLOGY APPARATUS AND ASSOCIATED METHODS FOR A LITHOGRAPHIC PROCESS

This application is a divisional of U.S. patent application Ser. No. 16/105,013, filed Aug. 20, 2018, now U.S. Pat. No. 10,677,589 B2, which claims the benefit of priority of European patent application no. EP17188175, filed Aug. 28, 2017, each of which is incorporated herein in its entirety by reference.

FIELD

The present disclosure relates to a substrate, a metrology apparatus and associated methods for a lithographic process. In particular, the invention may relate to, but need not be limited to, a substrate, metrology apparatus and associated methods for measuring pitch walk in a lithographic process.

BACKGROUND

A lithographic apparatus is a machine that applies a desired pattern onto a substrate, usually onto a target portion of the substrate. A lithographic apparatus can be used, for example, in device manufacturing processes, such as in the manufacture of integrated circuits (ICs). In that instance, a patterning device, which may alternatively be referred to as a mask or a reticle, may be used to generate a circuit pattern to be formed on an individual layer of the IC. This pattern can be transferred onto a target portion (e.g., comprising part of, one, or several dies) on a substrate (e.g., a silicon wafer). Transfer of the pattern is typically via imaging onto a layer of radiation-sensitive material (resist) provided on the substrate. A single substrate may include a network of adjacent target portions that are successively patterned. Lithographic apparatus may include a stepper and/or scanner. A stepper may be configured such that each target portion is irradiated by exposing an entire pattern onto the target portion at one time. A scanner may be configured such that each target portion is irradiated by scanning the pattern through a radiation beam in a given direction (the "scanning"-direction) while synchronously scanning the substrate parallel or anti-parallel to this direction. It is also possible to transfer the pattern from the patterning device to the substrate by imprinting the pattern onto the substrate.

In order to monitor a device manufacturing process such as a lithographic process, one or more parameters of the patterned substrate (and therefore of any aspect of the device manufacturing process that affects the patterned substrate) may be measured. The one or more parameters may include, for example, the overlay error between successive layers formed in or on the patterned substrate and/or critical dimension (e.g. linewidth, or the like) of developed photosensitive resist and/or etched product features. One or more of the parameters may include feature heights and/or feature pitches. These measurements may be performed on a product substrate and/or on a dedicated metrology target. There are various techniques for making measurements of the structures formed in lithographic processes, including the use of scanning electron microscopes and various specialized tools. A fast and non-invasive form of specialized inspection tool is a scatterometer in which a beam of radiation is directed onto a target on the surface of the substrate and properties of the scattered or reflected beam are measured. By comparing properties of the beam before and after it has been reflected, diffracted and/or scattered by the substrate, one or more properties of the substrate may be determined. This can be done, for example, by comparing the reflected beam with data stored in a library of known measurements associated with one or more known substrate properties or data calculated in real time from a model of the scattering structure.

SUMMARY

Multiple patterning is a class of techniques used to increase feature density. In double patterning, for example, a lithographic process is enhanced to halve a minimum spacing between separate features. In quadruple patterning, a lithographic process is enhanced to reduce the minimum spacing by a factor of four.

Spacer patterning, which may also be referred to as Spacer Process Technology (SPT), is a multiple patterning technique in which layers are formed on sidewalls of pre-patterned (or mandrel) features. The pre-patterned features are subsequently removed to leave two residual sidewall features for each pre-patterned feature. Where the widths of the pre-patterned features are exactly equal to the separations between the pre-patterned features, features formed using the residual sidewall features will be spaced apart from each other with a single, common separation distance. Errors in the spacer patterning process can, however, cause the separation between adjacent features to vary. In the case of double patterning, the variation may comprise a separation distance that alternates. An alternating separation distance may be referred to as pitch walk. Pitch walk may occur for example when an error in the lithographic process causes the width of the pre-patterned features to be different to the separation between the pre-patterned features. Pitch walk may also arise in other forms of multiple patterning, for example in non-spacer techniques such as Litho-Etch-Litho-Etch (LELE).

Pitch walk may be measured in special target patterns in a substrate where a bias is introduced in either the CD or the pitch. However, the bias introduced is often larger than tolerated by design rules/process windows for a lithographic process. Alternatively, device structures may be measured at multiple stages of the process by a step that provides measurement of process parameters. The process parameters may be measured at different stages of the lithographic process. The process parameter may be combined together to "estimate" the pitch walk at the final patterning step. However, many recipes may have to be made, each of which may have an individual error that may to introduce a large error in the estimation. This method may be logistically difficult due to the number of steps involved. For example, significant effort in making multiple metrology recipes (e.g. a SPT process such as self-aligned quadruple patterning (SAQP) might require 4-5 steps, for example) may be required. Each recipe may have its own metrology bias. When all measurements are combined this bias can overshadow the accuracy required for pitch walk metrology.

Accurate measurement of one or more properties of device manufacturing processes, including measurement of pitch walk resulting from multiple patterning process, can be difficult, time consuming, or both.

According to an example of the present disclosure there is provided a substrate comprising a plurality of features for use in measuring a parameter of a device manufacturing process by illumination of the features with measurement radiation from an optical apparatus and detecting a signal arising from interaction between the measurement radiation and the features, wherein the plurality of features comprise first features distributed in a periodic fashion at a first pitch, and second features distributed in a periodic fashion at a second pitch, and wherein the first pitch and second pitch are such that a combined pitch of the first and second features is constant irrespective of the presence of pitch walk in the plurality of features.

The use of first and second features having a constant combined pitch allows parameters S1 and S2, which can be used to define pitch walk, to be independently detectable using specular reflected radiation. This in turn allows accurate determination of pitch walk.

Optionally, the first features have been fabricated using a spacer patterning method and the combined pitch is a multiple of a width of a mandrel used in the spacer patterning method.

Optionally, the first and second features are spatially coincident in x and y dimensions of the substrate.

Optionally, the first and second features are fabricated on separate layers formed in or patterned on the substrate.

Optionally, the first and second features are fabricated on a single layer formed in or patterned on the substrate.

Optionally, one or more first features comprises a second feature, the height of which has been at least partially reduced.

Optionally, the first features have a reduced height compared to the second features over at least part of a length and/or width of the first features in x and y dimensions of the substrate, wherein the height of the features is defined along a corresponding z-axis, normal to the substrate.

Optionally, a ratio of the height of the first features to the second features is 0.9 or less; 0.8 or less; 0.7 or less; 0.6 or less; or 0.5 or less.

Optionally, the height of the first features to the second features is 0.1 or more; 0.2 or more; or 0.3 or more.

Optionally, the first features have been formed by removal of at least part of one or more of the second features to reduce their height, or by depositing at least one layer on one or more of the second features to increase their height.

Optionally, the first and second structures form a plurality of repeating periodic unit cell structures, each unit cell structure comprising at least one first feature and at least one second feature.

Optionally, the distribution of the at least one first and second features in the unit cell is such that the unit cell is symmetric.

Optionally, the unit cell has a width and/or length that is less than 150 nm; less than 100 nm; less than 80 nm; less than 60 nm; or less than 40 nm.

Optionally, the first and second features are arranged such that a signal comprising specular reflected radiation arising from interaction between the measurement radiation and the first and second features comprises $0^{th}$ diffraction order and is measureable using the optical apparatus to determine the parameter of the device manufacturing process.

Optionally, the first and second features are arranged such that a pitch walk error of the first and/or second features produces distinguishable pupil images in the pupil plane.

Optionally, the first and second features comprise lines fabricated in or patterned on the substrate by the device manufacturing process.

Optionally, the first pitch is greater than the second pitch and is optionally a multiple of the second pitch.

Optionally, the second pitch is less than 100 nm; less than 80 nm; less than 60 nm; less than 40 nm; less than 20 nm; or less than 10 nm.

A substrate comprising a plurality of features for use in measuring a parameter of a device manufacturing process by illumination of the features with measurement radiation from an optical apparatus and detecting a signal arising from interaction between the measurement radiation and the plurality of features, wherein the plurality of features are distributed in a periodic fashion defining a common pitch of less than 100 nm between adjacent features, and wherein one or more first features of the plurality of features has an at least partially reduced height compared to one or more second features of the plurality of features.

According to an example of the present disclosure there is provided a metrology apparatus for measuring a parameter of a device manufacturing process based on information acquired by an optical apparatus, the optical apparatus configured to illuminate a plurality of features of a substrate with measurement radiation and to detect a signal comprising specular reflected radiation arising from interaction between the measurement radiation and the plurality of features by measuring the signal using the optical apparatus, wherein the plurality of features comprise first features distributed in a periodic fashion at a first pitch, and second features distributed in a periodic fashion at a second pitch, and wherein the first pitch and second pitch are such that a combined pitch of the first and second features is constant irrespective of the presence of pitch walk in the plurality of features, the metrology apparatus comprising: a processor configured to: determine an expected distribution of the specular reflected radiation, based on a model; compare a measured distribution of the specular reflected radiation with the determined expected distribution of the specular reflected radiation to determine an error therebetween; and if the error is below a threshold, determine the parameter to be a parameter associated with the model; or if the error is above a threshold, update the model.

Optionally, the measured distribution of the specular reflected radiation is measured in the pupil plane.

Optionally, the specular reflected radiation comprises $0^{th}$ order diffracted radiation.

According to an example of the present disclosure there is provided a method of measuring a parameter of a device manufacturing process based on information acquired by an optical apparatus, the optical apparatus configured to illuminate a plurality of features of a substrate with measurement radiation and to detect a signal comprising specular reflected radiation arising from interaction between the measurement radiation and the plurality of features by measuring the signal using the optical apparatus, wherein the plurality of features comprise first features distributed in a periodic fashion at a first pitch, and second features distributed in a periodic fashion at a second pitch, and wherein the first pitch and second pitch are such that a combined pitch of the first and second features is constant irrespective of the presence of pitch walk in the plurality of features, the method comprising: determining an expected distribution of the specular reflected radiation, based on a model; comparing a measured distribution of the specular reflected radiation with the determined expected distribution of the specular reflected radiation to determine an error therebetween; and if the error is below a threshold, determining the parameter to be a parameter associated with the model; or if the error is above a threshold, updating the model.

According to an example of the present disclosure there is provided a computer program comprising instructions which, when executed on at least one processor, cause the at least one processor to control an apparatus to carry out any method disclosed herein.

According to an example of the present disclosure there is provided a carrier containing the computer program above, wherein the carrier is one of an electronic signal, optical signal, radio signal, or non-transitory computer readable storage medium.

BRIEF DESCRIPTION OF THE DRAWINGS

Examples of the present disclosure will now be described, by way of example only, with reference to the accompanying schematic drawings, in which:

FIG. 10 depicts in schematic side section a periodic target structure formed by double patterning, with zero pitch walk;

FIG. 11 depicts in schematic side section a periodic target structure formed by double patterning, with non-zero pitch walk;

FIGS. 12a and 12b respectively depict schematic elevated/plan views of a substrate including a plurality of products and an expanded view of part of one of the products;

FIGS. 13a, 13b and 13c respectively depict cross-section views of examples of substrates having different structural characteristics according to an example of the present disclosure;

DETAILED DESCRIPTION OF THE DRAWINGS

Figure 1:
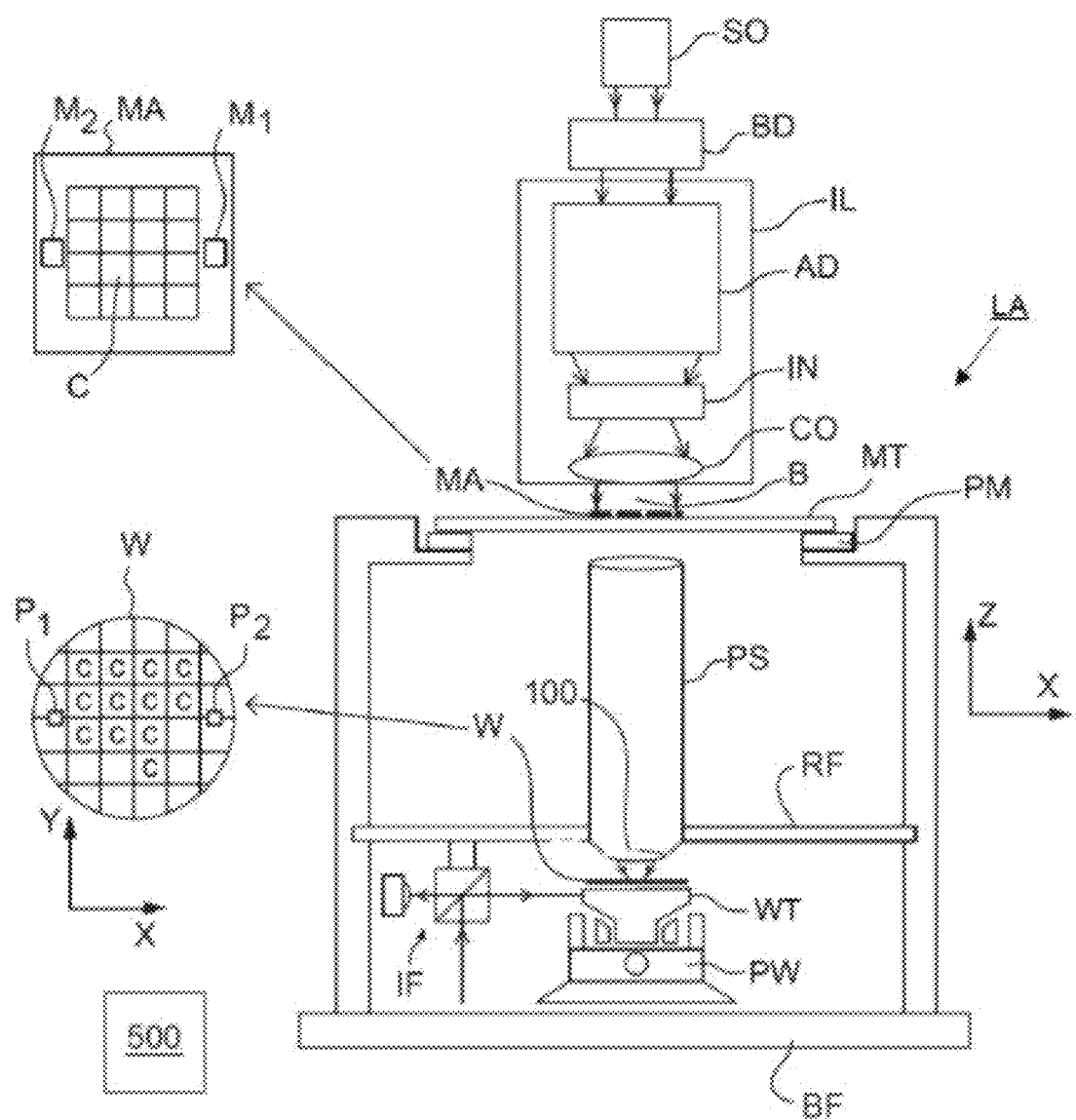
FIG. 1 depicts a lithographic apparatus.

FIG. 1 schematically depicts an example of a lithographic apparatus LA. The lithographic apparatus LA includes an illumination system (e.g. illuminator) IL configured to condition a radiation beam B (which may comprise UV, DUV, EUV radiation and/or any other wavelengths), a support structure (e.g., a mask table) MT constructed to support a patterning device (e.g., a mask) MA and connected to a first positioner PM configured to accurately position the patterning device in accordance with certain parameters, a substrate table (e.g., a wafer table) WT constructed to hold a substrate (e.g., a resist coated wafer) W and connected to a second positioner PW configured to accurately position the substrate in accordance with certain parameters, and a projection system (e.g., a refractive projection lens system) PS configured to project a pattern imparted to the radiation beam B by patterning device MA onto a target portion C (e.g., comprising one or more dies) of the substrate W.

The illumination system IL may include various types of optical components, such as refractive, reflective, magnetic, electromagnetic, electrostatic, or other types of optical components, or any combination thereof, for directing, shaping, or controlling radiation.

The support structure supports the patterning device MA in a manner that depends on the orientation of the patterning device MA, the design of the lithographic apparatus LA, and other conditions, such as for example whether or not the patterning device MA is held in a vacuum environment. The support structure MT can use mechanical, vacuum, electrostatic or other clamping techniques to support the patterning device MA. The support structure MT may include a frame, table, or the like, which may be fixed or movable as required. The support structure MT may ensure that the patterning device MA is at a desired position, for example with respect to the projection system PS. Any use of the terms "reticle" herein may be considered synonymous with the more general term "patterning device".

The term "patterning device" used herein may refer to any device that can be used to impart a radiation beam with a pattern in its cross-section such as to create a pattern in a target portion of the substrate. It should be noted that the pattern imparted to the radiation beam may not exactly correspond to the desired pattern in the target portion of the substrate, for example if the pattern includes phase-shifting features or so-called assist features. In an example, the pattern imparted to the radiation beam may correspond to a particular functional layer in a device being created in the target portion, such as an integrated circuit.

The patterning device MA may be transmissive or reflective. Examples of patterning devices include reticles, masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam B in different directions. The tilted mirrors impart a pattern in a radiation beam, which is reflected by the mirror matrix.

The term "projection system" used herein may refer to various types of projection system PS, including refractive, reflective, catadioptric, magnetic, electromagnetic and electrostatic optical systems, or any combination thereof, as appropriate for the exposure radiation being used, or for other factors such as the use of an immersion liquid or the use of a vacuum. Any use of the term "projection lens" herein may be considered as synonymous with the more general term "projection system."

In this example, the lithographic apparatus LA is of a transmissive type (e.g., employing a transmissive patterning device MA). Alternatively, the lithographic apparatus LA may be of a reflective type (e.g., employing a programmable mirror array of a type as referred to above, or employing a reflective mask).

The lithographic apparatus LA may be of a type having two (dual stage) or more substrate tables and, for example, two or more patterning device tables. In such "multiple stage" machines the additional tables may be used in parallel, or preparatory steps may be carried out on one or more tables while one or more other tables are being used for exposure.

The lithographic apparatus may also be of a type wherein at least a portion of the substrate W may be covered by a liquid having a relatively high refractive index, e.g., water, so as to fill a space between the projection system and the substrate. An immersion liquid may also be applied to other spaces in the lithographic apparatus, for example between the patterning device MA and the projection system PS. Immersion techniques may be used for increasing the numerical aperture of projection systems.

Referring to FIG. 1, the illuminator IL receives a radiation beam B from a radiation source SO. The source and the lithographic apparatus LA may be separate entities. In an example, the source may not be considered to form part of the lithographic apparatus LA such that the radiation beam B is passed from the source SO to the illuminator IL with the aid of a beam delivery system BD comprising, for example, suitable directing mirrors and/or a beam expander. In another example, the source SO may be an integral part of the lithographic apparatus LA. The source SO and the illuminator IL, together with the beam delivery system BD if required, may be referred to as a radiation system.

The illuminator IL may comprise an adjuster AD for adjusting the angular intensity distribution of the radiation beam. Generally, at least the outer and/or inner radial extent (which are commonly referred to as σ-outer and σ-inner, respectively) of the intensity distribution in a pupil plane of the illuminator can be adjusted. In addition, the illuminator IL may comprise various other components, such as an integrator IN and a condenser CO. The illuminator may be used to condition the radiation beam to have a desired uniformity and intensity distribution in its cross section.

The radiation beam B is incident on the patterning device (e.g., patterning device MA), which is held on the support structure (e.g., mask table) MT, and is patterned by the patterning device MA. Having traversed the patterning device MA, the radiation beam B passes through the projection system PS, which focuses the beam onto a target portion C of the substrate W. With the aid of the second positioner PW and position sensor IF (e.g., an interferometric device, linear encoder, 2-D encoder or capacitive sensor, or the like), the substrate table WT can be moved accurately, e.g., so as to position different target portions C in the path of the radiation beam B. Similarly, the first positioner PM and another position sensor (which is not explicitly depicted in FIG. 1) can be used to accurately position the patterning device MA with respect to the path of the radiation beam B, e.g., after mechanical retrieval from a mask library, or during a scan. In general, movement of the support structure MT may be realized with the aid of a long-stroke module (coarse positioning) and a short-stroke module (fine positioning), which form part of the first positioner PM. Similarly, movement of the substrate table WT may be realized using a long-stroke module and a short-stroke module, which form part of the second positioner PW. In the case of a stepper (as opposed to a scanner) the support structure MT may be connected to a short-stroke actuator only, or may be fixed. Patterning device MA and substrate W may be aligned using patterning device alignment marks M1, M2 and substrate alignment marks P1, P2. Although the substrate alignment marks as illustrated occupy dedicated target portions, they may be located in spaces between target portions (these may be referred to as scribe-lane alignment marks). Similarly, in situations in which more than one die is provided on the patterning device MA, the patterning device alignment marks may be located between the dies.

The depicted lithographic apparatus LA may be used in at least one of the following modes:

1. In step mode, the support structure MT and the substrate table WT are kept essentially stationary, while an entire pattern imparted to the radiation beam is projected onto a target portion C at one time (i.e., a single static exposure). The substrate table WT is then shifted in the X and/or Y direction so that a different target portion C can be exposed. In step mode, the maximum size of the exposure field limits the size of the target portion C imaged in a single static exposure.

2. In scan mode, the support structure MT and the substrate table WT are scanned synchronously while a pattern imparted to the radiation beam is projected onto a target portion C (i.e., a single dynamic exposure). The velocity and direction of the substrate table WT relative to the support structure MT may be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

3. In another mode, the support structure MT is kept essentially stationary holding a programmable patterning device, and the substrate table WT is moved or scanned while a pattern imparted to the radiation beam is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

Figure 2:
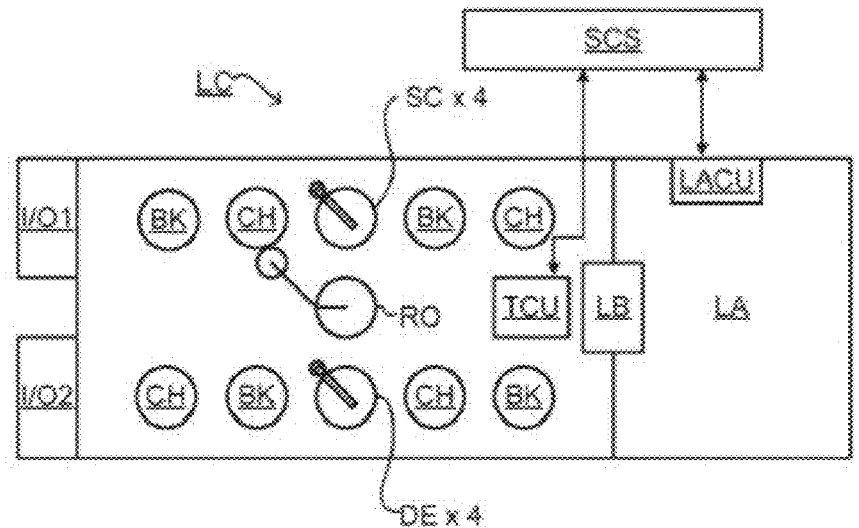
FIG. 2 depicts a lithographic cell or cluster.

As shown in FIG. 2 the lithographic apparatus LA may form part of a lithographic cell LC, also sometimes referred to as a lithocell or cluster, which also includes apparatus to perform pre- and post-exposure processes on a substrate W. Conventionally these include one or more spin coaters SC to deposit resist layers, one or more developers DE to develop exposed resist, one or more chill plates CH and/or one or more bake plates BK. A substrate handler, or robot, RO picks up substrates from input/output ports I/O1, I/O2, moves them between the different process apparatuses and delivers then to the loading bay LB of the lithographic apparatus. These devices, which are often collectively referred to as the track, are under the control of a track control unit TCU that is itself controlled by the supervisory control system SCS, which also controls the lithographic apparatus via lithography control unit LACU. Thus, the different apparatus can be operated to maximize throughput and processing efficiency.

In order that the substrates that are exposed by the lithographic apparatus are exposed correctly and consistently, it may be desirable to inspect exposed substrates to measure properties such as overlay errors between subsequent layers, line thicknesses, critical dimensions (CD), etc. If errors are detected, adjustments, for example, can be made to exposures of subsequent substrates, especially if the inspection can be done soon and fast enough that other substrates of the same batch are still to be exposed. Also, already exposed substrates may be stripped and reworked to improve yield, or possibly be discarded, thereby avoiding performing exposures on substrates that are known to be faulty. In a case where only some target portions of a substrate are faulty, further exposures can be performed only on those target portions that are deemed to be non-faulty.

An inspection apparatus, which may also be referred to as a metrology apparatus, is used to determine the properties of the substrates, for example, how the properties of different substrates or different layers of the same substrate vary from layer to layer. The inspection apparatus may be integrated into the lithographic apparatus LA, the lithocell LC, or any other apparatus, or may be a stand-alone device. A plurality of inspection apparatus may be provided for a production line for manufacturing devices. For example, there may be at least one inspection apparatus at one or more stages of the production line. To enable rapid measurements, it may be desirable for the inspection apparatus to measure properties in the exposed resist layer immediately after the exposure. However, the latent image in the resist may have a very low contrast, as in there may only be a very small difference in refractive index between the parts of the resist which have been exposed to radiation and those which have not. Some inspection apparatus may not have sufficient sensitivity to make useful measurements of the latent image. Measurements may be taken after the post-exposure bake step (PEB) that is customarily the first step carried out on exposed substrates and increases the contrast between exposed and unexposed parts of the resist. At this stage, the image in the resist may be referred to as semi-latent. It is also possible to make measurements of the developed resist image, at which point either the exposed or unexposed parts of the resist have been removed, or after a pattern transfer step such as etching. The latter possibility may limit the possibilities for rework of faulty substrates but may still provide useful information. It will be appreciated that the inspection apparatus may be used to perform measurements during any appropriate stage of the lithographic process. It will also be appreciated that the inspection apparatus may be configured to perform measurements on at least one feature of the substrate, for example, a product feature, dedicated metrology target/feature, and/or the like.

Figure 3:
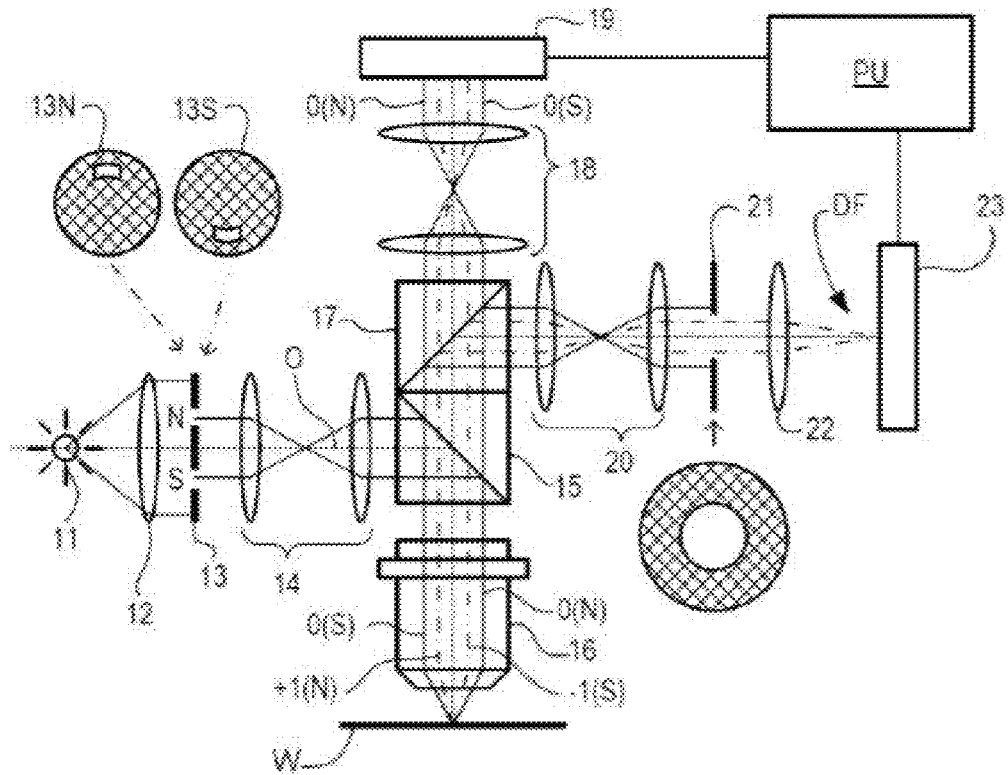
FIG. 3 depicts a scatterometer used in metrology.

FIG. 3 is a schematic diagram of an optical apparatus in the form of a scatterometer suitable for performing metrology in conjunction with the lithocell of FIG. 2. The apparatus may be used for measuring critical dimensions of features formed by lithography, measuring overlay between layers, measuring pitch walk, and/or the like. A product feature or dedicated metrology target may be formed on substrate W. The apparatus may be a stand-alone device or incorporated in either the lithographic apparatus LA, e.g., at the measurement station, the lithographic cell LC, or at any appropriate location in a production line. An optical axis, which has several branches throughout the apparatus, is represented by a dotted line O. In this example, light emitted by source 11 is directed onto substrate W via a beam splitter 15 by an optical system comprising lenses 12, 14 and objective lens 16. These lenses are arranged in a double sequence of a 4 F arrangement. A different lens arrangement can be used, provided that it still provides an image of the source on the substrate, and simultaneously allows for access of an intermediate pupil-plane for spatial-frequency filtering. Therefore, the angular range at which the radiation is incident on the substrate can be selected by defining a spatial intensity distribution in a plane that presents the spatial spectrum of the substrate plane, here referred to as a (conjugate) pupil plane. This can be done by inserting an aperture plate 13 of suitable form between lenses 12 and 14, in a plane that is a back-projected image of the objective lens pupil plane. For example, as illustrated, aperture plate 13 can take different forms, two of which are labeled 13N and 13S, allowing different illumination modes to be selected. The illumination system in the illustrated example forms an off-axis illumination mode. In the first illumination mode, aperture plate 13N provides off-axis from a direction designated, for the sake of description only, as 'north'. In a second illumination mode, aperture plate 13S is used to provide similar illumination, but from an opposite direction, labeled 'south'. Other modes of illumination are possible by using different apertures. The rest of the pupil plane may be dark as any unnecessary light outside the desired illumination mode may interfere with the desired measurement signals.

At least the 0th and potentially at least one of the −1 and +1 (and potentially higher) orders diffracted by the target on substrate W may be collected by objective lens 16 and directed back through beam splitter 15. A second beam splitter 17 divides the diffracted beams into two measurement branches. In a first measurement branch, optical system 18 forms a diffraction spectrum (pupil plane image) of the target on first sensor 19 (e.g., a CCD or CMOS sensor) using the 0th and potentially first and higher order diffractive beams. Each diffraction order may be incident on a different point on the sensor, so that image processing may be capable of measuring, comparing and/or contrasting orders. The pupil plane image captured by sensor 19 may be useable for focusing the metrology apparatus and/or normalizing intensity measurements of the first order beam. The pupil plane image may be used for any appropriate measurement purpose, for example, reconstruction of features, or the like. As explained herein, the pupil plane image may be used for measuring properties of specular reflected radiation (e.g. including at least a $0^{th}$ diffractive order) to determine at least one parameter of a device manufacturing process.

In the second measurement branch, optical system 20, 22 forms an image of the target on the substrate W on sensor 23 (e.g., a CCD or CMOS sensor). In the second measurement branch, an aperture stop 21 is provided in a plane that is conjugate to the pupil-plane. Aperture stop 21 functions to block the zeroth order diffracted beam so that the image of the target formed on sensor 23 is formed only from the −1 or +1 first order beam. The image detected by sensor 23 is thus referred to as a 'dark-field' image. Note that the term 'image' is used here in a broad sense. An image of the grating lines as such will not be formed, if only one of the −1 and +1 orders is present.

The images captured by sensors 19 and 23 are output to image processor and controller PU, the function of which will depend on the particular type of measurements being performed.

Examples of scatterometers and techniques can be found in U.S. patent application publication nos. US 2006/066855 A1, WO 2009/078708, WO 2009/106279, and US 2011/0027704 A, the contents of all of which are incorporated by reference herein in their entireties.

In the following, methods of measuring a parameter of a device manufacturing process, particularly of a lithographic process, according to examples are described. The methods may be applicable to measuring a parameter of a lithographic process comprising multiple patterning, for example double patterning (e.g. self-aligned double patterning (SADP), or the like) or quadruple patterning (e.g. self-aligned quadruple patterning (SAQP), or the like). An example of a double patterning process using spacer patterning is described below with reference to FIGS. 4-9. At least one example of the present disclosure may be used where other forms of multiple patterning are used (spacer or non-spacer) and even in processes which do not involve multiple patterning.

Figure 4:
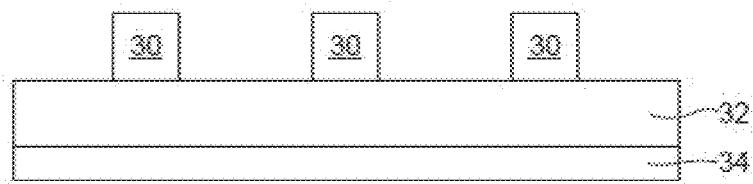
FIGS. 4-9 schematically depict stages in an example double patterning process using spacer patterning.

FIG. 4 depicts a substrate 34. A base layer 32 is formed on the substrate 34. A patterned layer comprising a plurality of pre-patterned features or mandrels 30 (e.g. lines), forming a first pattern, is formed on the base layer 32.

Figure 5:
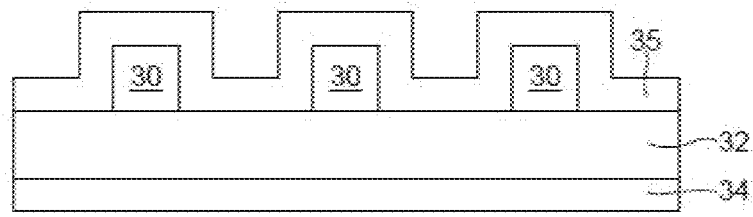

In a subsequent step, as depicted in FIG. 5, a film layer 35 is deposited onto the patterned layer.

Figure 6:
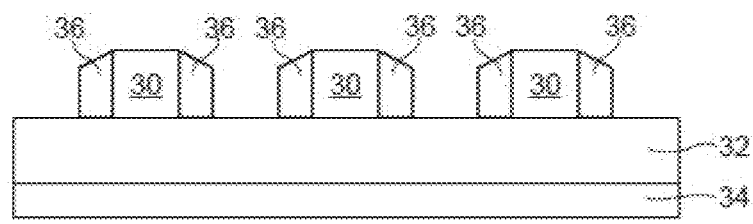

In a subsequent step, as depicted in FIG. 6, etching is performed to remove material from the film layer 35 on the horizontal surfaces. Layers 36 are thereby formed on sidewalls of the pre-patterned features 30. The layers 36 may be referred to as spacers. As can be seen, the distance between the spacers 36 is dependent on the width of the pre-patterned features 30 and also the distance between adjacent ones of the preformed features. The pitch between adjacent spacers 36 is therefore a function of the width and/or the space between adjacent pre-patterned features 30.

Figure 7:
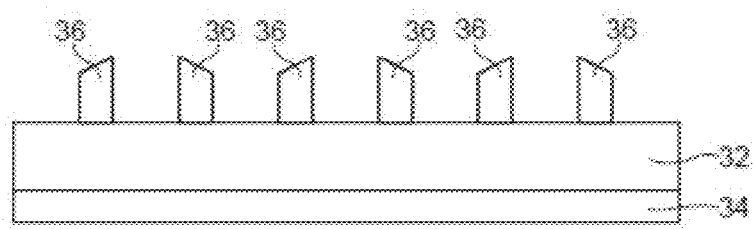

In a subsequent step, as depicted in FIG. 7, the pre-patterned features 30 are removed leaving the spacers 36 forming a pattern having twice the density of the original pattern of pre-patterned features 30 (because each of the pre-patterned features 30 had two sidewalls and each sidewall produces one of the spacers 36).

Figure 8:
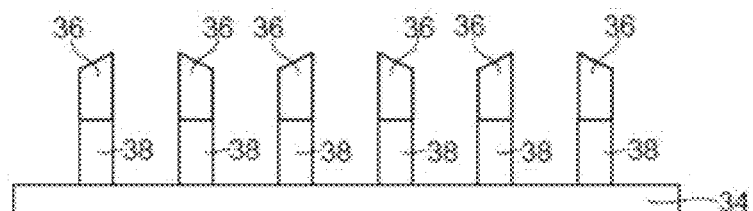

In a subsequent step, as depicted in FIG. 8, the spacers 36 are used as a mask to define selective etching of the base layer 32 to form a second pattern of features 38.

Figure 9:
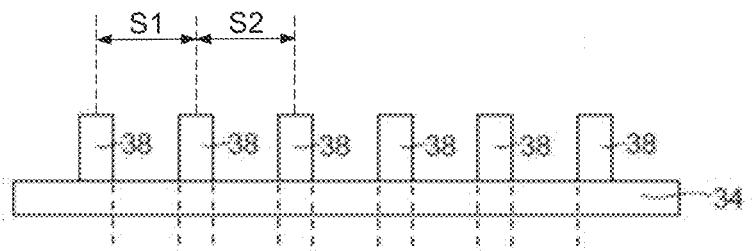

In a subsequent step, as depicted in FIG. 9, the spacers 36 are removed, leaving the second pattern of features 38 formed by the remaining material of the base layer. The second pattern (shown in FIG. 9) comprises twice as many features as the first pattern (shown in FIG. 4).

The process described above with reference to FIGS. 4-9 is sometimes referred to as Self-Aligned Double Patterning (SADP). The process can be repeated based on the features 38 of the second pattern instead of the first pattern, thereby doubling the feature density a second time. This type of process is sometimes referred to as Self-Aligned Quadruple Patterning (SAQP). The process can in principle be repeated further to produce further increases in feature density.

Referring to FIG. 9, the separation distances S1 are determined by the width of the pre-patterned features 30. The separation distances S2 are determined by the separation distances between adjacent pairs of the pre-patterned features 30. A difference between S1 and S2 will result in an effective overlay error between odd and even features 38. The separation distance between adjacent features for a case where S1-S2 is non-zero will therefore alternate. An alternating separation distance may be referred to as pitch walk. FIG. 10 depicts a portion of a structure with zero pitch walk (S1=S2). FIG. 11 depicts a portion of a structure with non-zero pitch walk (S1≠S2). It may be desirable to monitor and control any difference between S1 and S2 (e.g. to ensure the difference does not exceed a predetermined threshold). It is noted that the summation of S1 and S2 remains essentially constant even if there is pitch walk because of the method of fabrication of the features 38 described above.

Techniques for measuring S1-S2 (and therefore pitch walk) may have various shortcomings.

Scanning electron microscopy (CD-SEM) may be used to measure S1-S2. Scanning electron microscopy is, however, relatively slow (typically requiring several seconds to make the measurement). CD-SEM measures with high localization on the device, meaning that a large number of inspection points may be required to inspect the aggregate target performance. Furthermore, it may be difficult to discriminate between S1 and S2.

Scatterometric techniques provide improved speed but can have low sensitivity, particularly for small values of S1-S2.

The structures defined by the features 38 (and the separation thereof) in FIGS. 10 and 11 are such that the specular reflected radiation does not yield any information, or at least does not provide sufficient information, to determine the value of S1 or S2 (e.g. to determine the level of pitch-walk, and/or another parameter) by analyzing information obtained at the pupil plane of the optical apparatus (e.g. by using the first sensor 19 of the scatterometer in FIG. 3).

However, it will be appreciated that the structure (e.g. CD, or the like), configuration, distribution and/or any other parameter associated with the features 38 in FIG. 11 may still be capable of being measured in the pupil plane or another plane of the optical apparatus. Thus, in the example of FIGS. 10 and 11, it may still be possible to determine at least one parameter from a measurement of the signal in the pupil plane and/or any other plane of the optical apparatus.

An example of a method of measuring a parameter (such as pitch walk, and/or at least one other parameter) of a device manufacturing process (e.g. part of a lithographic process) based on information acquired by the optical apparatus (for example, using the scatterometer of FIG. 3, or another appropriate optical apparatus) is described below. The present disclosure recognizes that by providing a substrate W including features with certain structural characteristics, it may be possible to measure the parameter (such as pitch walk, and/or other parameters) using specular reflected radiation arising from interaction between measurement radiation and the substrate W. The specular reflected radiation may include 0th order radiation after interaction with the features. If present, 1st and/or higher diffractive orders may affect at least one property of the specular reflected radiation, for example, via interaction of an evanescent wave propagating through at least a part of the substrate W and the specular reflected radiation. The specular reflected radiation may comprise the 0th diffractive order of the signal arising from interaction between the measurement radiation and the features.

The method could use product features on a substrate W to measure the parameter. For example, a product formed on the substrate W may include features having certain characteristics corresponding to at least one of the examples described herein that enables the measurement of the parameter using only or at least the specular reflected radiation. In an example, the method may be capable of measuring the parameter using information present in the higher diffractive orders (e.g. 1st and/or higher orders which may be produced by the substrate W). It will be appreciated that the method may be capable of measuring or determining the parameter using at least one diffractive order (e.g. at least one selected from: the 0th, ±1st, or higher diffractive orders) in the pupil plane. The information yielded by the different diffractive orders may depend on the certain characteristics of the features. For example, different CD values, spacing values (e.g. S1 & S2), pitch values, and the like, may influence which diffractive order(s) contain relevant information that can be used to determine the parameter or parameters of interest.

The features having the certain characteristics may define at least one target. The term "target" used herein may refer to any structure that is used, or capable of being used, in a measurement process. A target may comprise a dedicated metrology target or a target may form part of a structure that is partially or completely provided for other purposes. A target may for example be formed from product features.

FIGS. 12a and 12b respectively depict schematic views of a substrate W including a plurality of products 40 and an expanded view of part 42 of one of the products 40. The part 42 includes a plurality of features, which in this example are in the form of spaced-apart lines 44 extending along a Y-axis of the substrate W and distributed in a periodic fashion along the X-axis. It will be appreciated that the distribution, size and configuration of products 40 on the substrate W and indeed the substrate W itself is purely schematic and not-to-scale. Further, the distribution, size and configuration of the lines 44 is purely schematic and not-to-scale.

FIGS. 13a, 13 and 13c respectively depict different examples of features on the substrate W having at least one structural characteristic that provides a part 42 comprising a plurality of features (e.g. the lines 44 of FIG. 12b, or the like) for use in measuring a parameter of a device manufacturing process. These examples depict cross-sectional views of the lines 44 (e.g. as depicted by the section A-A of FIG. 12b) such that the lines 44 are viewed in a direction along the Y-axis. The examples of FIGS. 13a-c illustrate lines 44 with different configurations (or patterns) of lines 44 having heights h (e.g. defined along the Z-axis). With reference to FIG. 12b, it will be appreciated that FIGS. 13a-c each only depict four adjacent lines 44 within the product 40, which may include a greater number of lines 44 including the same configuration or pattern of line heights h repeated along the X-axis. It will be appreciated that the configuration or pattern of lines 44 may not be the sole features of the product 40 and that there may be different parts 42 having different features (e.g. whether in the form of lines 44 or other shapes and/or materials).

FIGS. 13a-c differ from each other in terms of the pattern of heights h of the lines 44. FIG. 13a illustrates a pattern of four lines 44 each having an identical height h. FIG. 13b illustrates a pattern of four lines 44 with a first and fourth line 44' having a partially reduced height h' (in this example, a reduction in height of approximately 50%) and a second and fourth line 44 having the same height h as the lines 44 in FIG. 13a. FIG. 13c illustrates a pattern of four lines 44 with a first line 44' having a partially reduced height h' (in this example, a reduction in height of approximately 50% although other reductions may be considered) and a second, third and fourth line 44 having the same height has the lines 44 in FIG. 13a-b. The pattern of four lines 44/44' may be repeated in the other lines of the part 42 and/or may be repeated at other locations in the product 40. The lines 44' that are reduced in height h' may define "first features" of the substrate W. The lines 44 that are not reduced in height h may define "second features" of the substrate W.

In each of FIGS. 13a-13c, a common pitch 'p' can be defined between the lines 44, 44'. If no pitch walk is present then the common pitch p is identical for all of the lines 44, 44'. However, if pitch-walk is present, the common pitch p may change as a result of that error (e.g. such that the pitch between periodically spaced structures changes, for example, by increasing S1 or S2 and decreasing the other of S1 or S2 by a corresponding amount). It will be appreciated that the depicted patterns of four lines are merely examples and that any number/distribution of lines and/or other features may be repeated in a pattern (e.g. two, three, five lines/features, and the like).

An example of a common pitch p includes 10 nm or less, 20 nm or less, 30 nm or less, 50 nm or less, 100 nm or less, 150 nm or less, or 200 nm or less. Such a common pitch p may correspond to example feature sizes for a product on the substrate W. Thus, the present disclosure may describe apparatus, methods and/or systems for directly measuring at least one parameter such as pitch walk at the feature level on a substrate W. It will be appreciated that for larger pitches, for example 300 nm or more, 600 nm or more, the specular reflected radiation may include or be accompanied by a signal comprising at least one diffractive order that can be measured using the optical apparatus.

As shown in FIGS. 13a-c, the lines 44' represent first features and the lines 44 represent second features. It can be seen that the pitch between adjacent first feature 44' is a multiple of the pitch p between adjacent second features 44, which is also defined as the common pitch. If pitch walk is present in the features 44, 44' then the pitch p will vary, as explained above, because the values of S1 and S2 will change. However, the overall value of S1+S2 will remain essentially constant and is defined by the pre-patterned features 30 used to fabricate the features 44, 44'. Therefore, for example in FIGS. 13b and 13a, the pitch between the first features 44' might remain essentially constant. This is seen more clearly when the spatially limited representation of FIGS. 13b and 13c are extended to cover higher numbers of features 44, 44'.

Figure 14:
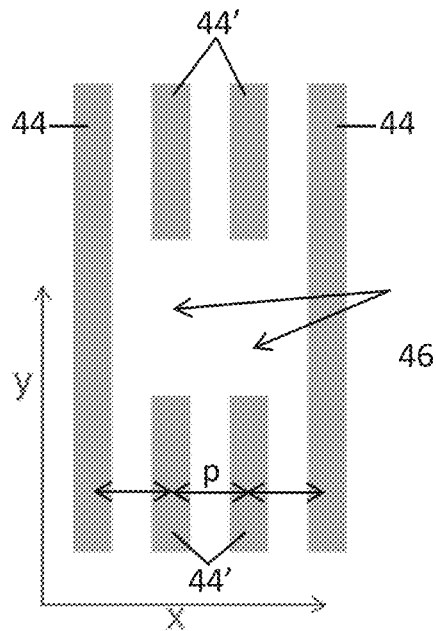
FIG. 14 depicts an elevated/plan view of another example of a substrate having a different structural characteristic to the substrates illustrated by FIGS. 13a, 13b and 13c.

FIG. 14 depicts a schematic plan view of another example of a pattern of lines 44, for example, as may be included in the part 42 of FIG. 12b. In this example, FIG. 14 is similar to FIG. 12b, illustrating lines 44 that extend along the Y-axis and are periodically distributed along the X-axis. In FIG. 14, two of the lines 44' include cuts 46 within the length (e.g. along the Y-axis) of the lines 44' such that the lines 44' effectively include two separate lines separated by the cuts 46. The cuts 46 in this example involve the complete removal of the lines 44' in the Z-axis. However, in another example, the cut 46 may involve only partial removal of the lines 44' in the Z-axis (e.g. similar to FIGS. 13b-c) to reduce the height of the lines 44'. FIG. 14 illustrates a pattern of four lines 44, 44' with a second and third line 44' each having a cut 46 (in this example, a reduction in height of 100% and extending for only part of the length of the line 44') and a first and fourth line 44 having the same height h as the lines 44 in FIGS. 13a-c. This pattern may be repeated in a similar manner to that described in relation to FIGS. 13a-c. The lines 44' that include cuts 46 may define "first features" of the substrate W. The lines 44 that are not reduced in height h may define "second features" of the substrate W.

Similar to the examples of FIGS. 13a-c, a common pitch 'p' can be defined between the lines 44, 44' in FIG. 14. It will be appreciated that the depicted pattern of four lines 44, 44' and cuts 46 is merely an example and that any number/distribution of lines, cuts and/or other features may be repeated in any pattern (e.g. two, three, five lines/features, and the like). It will further be appreciated that a product 40 may include features having any CD and/or pattern. For example, the product 40 may include a pattern of features that include a partial reduction of height h' and/or a cut 46 in at least one feature (e.g. a line 44, 44') of the product 40.

Figure 15A:
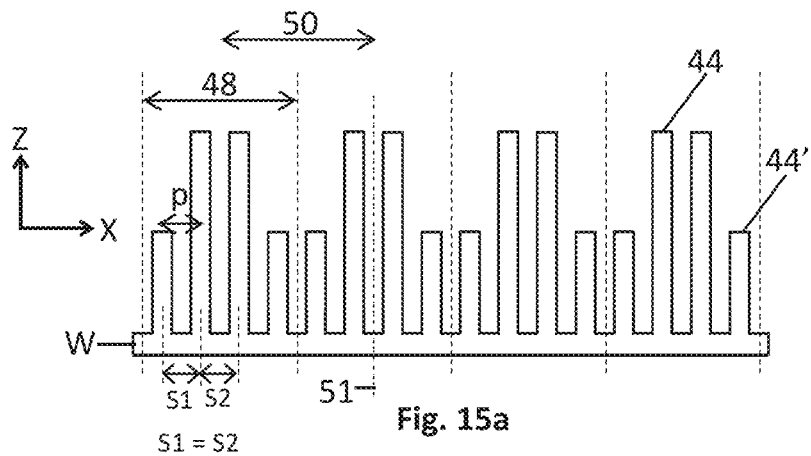
FIGS. 15a and 15b respectively depict a cross-section view of a substrate similar to the example of FIG. 13b without and with pitch-walk of the features.
Figure 15B:
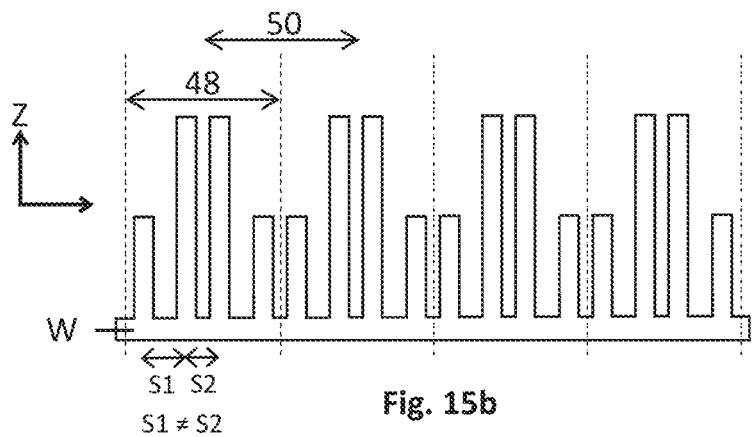

FIGS. 15a and 15b depict a substrate W including a plurality of unit cells 48. Each unit cell 48 includes a pattern of features (e.g. lines 44, 44') that is repeated along the X-axis such that a combined pitch 50 is defined between the first features 44' and the second features 44 across repeating unit cells 48. The unit cells 48 in FIGS. 15a-15b include a pattern of four lines 44, 44' that corresponds to the example depicted in FIG. 13b, however, the unit cells 48 may be defined such that they include a different number of features 44, 44'. For example, using the exemplary arrangement of FIG. 13c, the unit cell may be defined to include 5 features 44, 44' in total so as to provide a symmetrical unit cell. In the example of FIG. 15a, the combined pitch 50 is equal to '4p' or four times the common pitch 'p' irrespective of whether pitch walk is present (i.e. the combined pitch 50 is equal for both FIGS. 15a and 15b). The combined pitch may be defined as the smallest pitch that is an integer number of first features 44' and also an integer number of second features 44. The combined pitch 50 in the present example does not effectively change if the unit cells 48 include lines 44, 44' having an error indicative of pitch walk. The unit cells 48 include a symmetric pattern/sequence of lines 44, 44' about a centerline 51 of the unit cell 48. Either side of the centerline 51 is a mirror pattern of lines 44, 44'.

It is noted that in the examples provided in the Figures and described above, the first features 44' and the second features 44 are included on a single layer formed on the substrate W. In such examples, the first features 44' may be formed by reducing the height of the second features as described. However, in other arrangements, the first features 44' and the second features 44 may be in separate layers formed on the substrate W. In those arrangements, the relative heights of the first and second features need not be significant in the measurement of pitch walk. Irrespective of whether the first and second features are formed on a single layer or on separate layers, exemplary embodiments have pitches between the first and second features such that the combined pitch remains essentially constant irrespective of the amount of pitch walk imparted to the features as part of the lithographic process.

As will be appreciated, when the first and second features are on a single layer, the periodic nature of the second features 44 appears to be interrupted by the first features 44'. However, for the purposes of description, the pitch between the second features 44 is considered to be common throughout because the first and second features are overlaid.

Figure 16A:
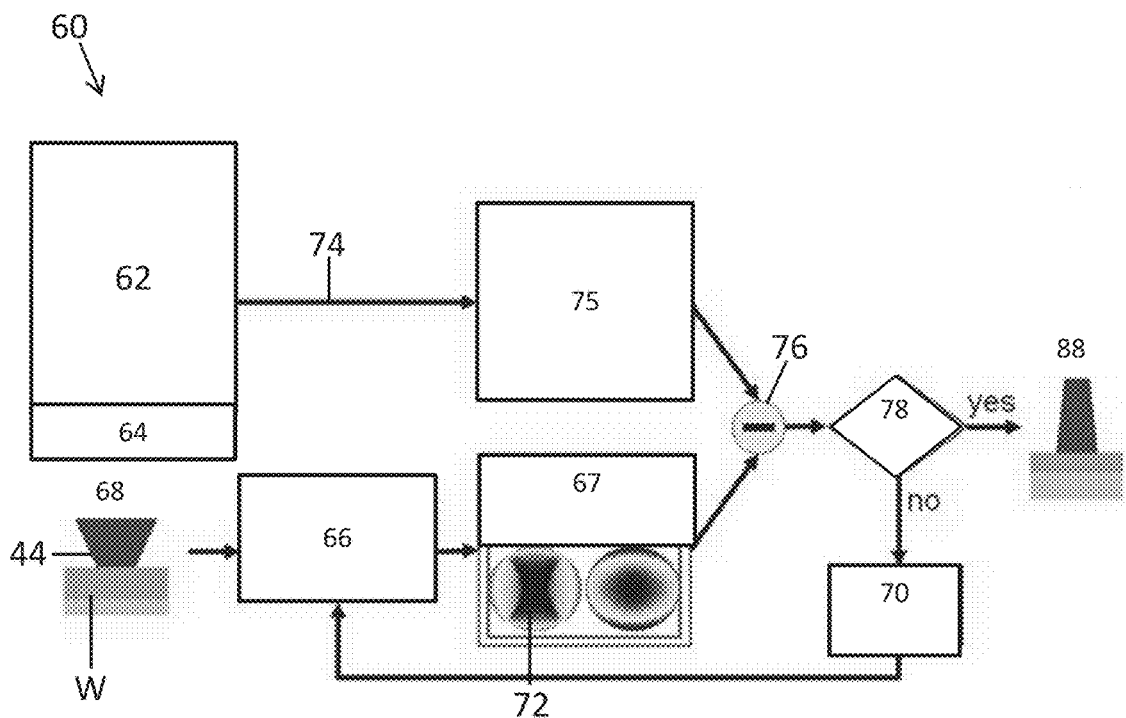
FIGS. 16a and 16b depict a system for determining a parameter according to an example of the present disclosure.

FIG. 16a depicts a system 60 for measuring a parameter (e.g. pitch-walk, CD, and the like) by illumination of the features (e.g. lines 44, 44' or any other appropriate features) with measurement radiation from an optical apparatus (see FIG. 3) and detecting a signal arising from interaction between the measurement radiation and the features. The system 60 includes a metrology apparatus 62 to measure the signal, for example, to measure an optical response of the substrate W to illumination by the measurement radiation. The metrology apparatus 62 may include the optical apparatus of FIG. 3 or any other appropriate apparatus, for example, an ellipsometer or the like for measuring at least one selected from: angle, phase, amplitude, intensity, polarization information or the like of the signal.

The metrology apparatus 62 is configured to measure a parameter of a device manufacturing process based on information acquired by the optical apparatus or another appropriate apparatus. The optical apparatus is configured to illuminate a plurality of features of the substrate W with measurement radiation and to detect a signal comprising specular reflected radiation arising from interaction between the measurement radiation and the plurality of features by measuring the signal using the optical apparatus, wherein the plurality of features are distributed in a periodic fashion defining a common pitch between adjacent features, and wherein one or more first features of the plurality of features has an at least partially reduced height compared to one or more second features of the plurality of features. The metrology apparatus 62 includes a processor 64. The processor 64 is configured to determine 66 an expected distribution of the specular reflected radiation, which may be in a pupil plane image. The expected distribution may define a "modeled optical response" 67 and arises from interaction between the measurement radiation and the features (e.g. lines 44, 44'). The expected distribution is determined based on a model (e.g. an initial model 68 or an updated model 70). The expected distribution is calculated by, for example, solving Maxwell's equations (e.g. via a forward call) for the reflection of the signal from a model of the features and its subsequent propagation through the optical apparatus.

In the present example, the modeled optical response 67 comprises a pupil plane representation 72 of the signal, the pupil plane representation 72 corresponding to an intensity distribution of the signal at the pupil plane of the optical apparatus. However, it will be appreciated that the processor 64 could alternatively or additionally be configured to determine an image plane representation or other representation of the signal. The metrology apparatus 62 is configured to measure 74 the distribution of the signal arising from interaction between the measurement radiation and the features (e.g. to provide a "measured optical response" 75). The processor 64 is configured to compare 76 the image based on the signal (e.g. the measured optical response 75) with the expected image (e.g. the modeled optical response) to determine an error therebetween. For example, the comparison 76 may include determining a difference between corresponding pixel intensity values of the image based on the signal and the expected image (e.g. by subtracting the difference). It will be appreciated that the comparison 76 may use any appropriate method to determine the error.

Figure 16B:
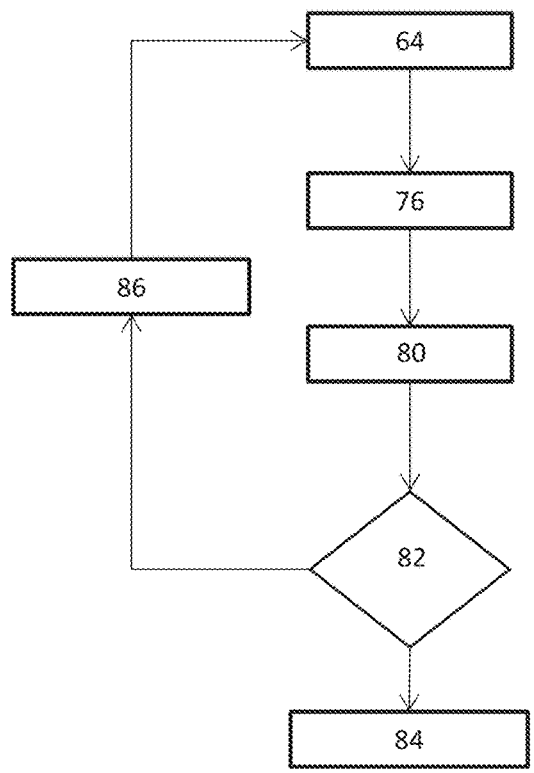

The processor 64 may be configured to determine whether the modeled optical response matches or substantially the measured optical response (e.g. by determining a fit 78). If the modeled and measured optical responses match or are sufficiently similar, the processor 64 may indicate that 'yes' the fit 78 is a good or 'best fit' and, based on the model of the substrate W features, reconstruct the feature or features. For example, as shown by FIG. 16b, the processor 64 is configured to implement the comparison 76. The processor 64 is configured to calculate if an error 80 between the expected and measured optical responses 67, 75 is below a threshold 82, the processor 64 may be configured to determine the parameter (e.g. pitch-walk, CD, or the like) to be a parameter 84 associated with the model 68 or 70. However, if the error 80 is above the threshold 82, the processor 64 may be configured to update 86 the model 68, 70 in order to generate a new modeled optical response 67 for comparison with the measured optical response 75 until the fit 78 is a good or 'best fit'.

Upon determining the model 68, 70 that best fits with the measured optical response, it is possible to determine the parameter or a plurality of parameters of the substrate W (e.g. to reconstruct a profile 88 such as CD or pitch-walk). If the best fit model 68, 70 indicates that pitch walk (and/or another error) is present, then a decision may be made whether to recalibrate the lithographic apparatus LA, continue with the lithographic process, remove any layers of the substrate W containing the error and start again, or even remove the substrate W, or the like. Certain products may be able to tolerate a certain level of pitch walk (and/or another error) but other products may not be able to tolerate that certain level of pitch-walk (and/or another error). Thus, the metrology apparatus 62 and associated methods may be capable of determining whether a lithographic manufacturing process is introducing an error into the products formed on the substrate W and take action at an appropriate time. Since error may result in the manufacture of lower quality or non-working products, determining error is a relevant part of the lithographic manufacturing process. The time taken to determine the error affects the efficiency of the manufacture of products. The metrology apparatus 62 and associated methods may be capable of determining the error faster than in prior examples such that the lithographic manufacturing process may proceed in a time efficient and cost effective manner.

The system 60 may be implemented in any appropriate manner. An example of a system that may be used as part of the system 60 is described in PCT patent application publication no. WO 2015/082158 A1, the contents of which is incorporated herein in its entirety by reference. PCT patent application publication no. WO 2015/082158 describes a reconstruction process that includes measuring structures formed on a substrate by a lithographic process, determining a reconstruction model for generating modeled patterns, and computing and minimizing a multi-variable cost function including model errors. Errors induced by nuisance parameters are modeled based on statistical description of the nuisance parameters' behavior, described by probability density functions. From the statistical description, model errors are calculated and expressed in terms of average model errors and weighing matrices. These are used to modify the cost function so as to reduce the influence of the nuisance parameters in the reconstruction, without increasing the complexity of the reconstruction model. The nuisance parameters may be parameters of the modeled structure, and/or parameters of an inspection apparatus used in the reconstruction.

Figure 17:
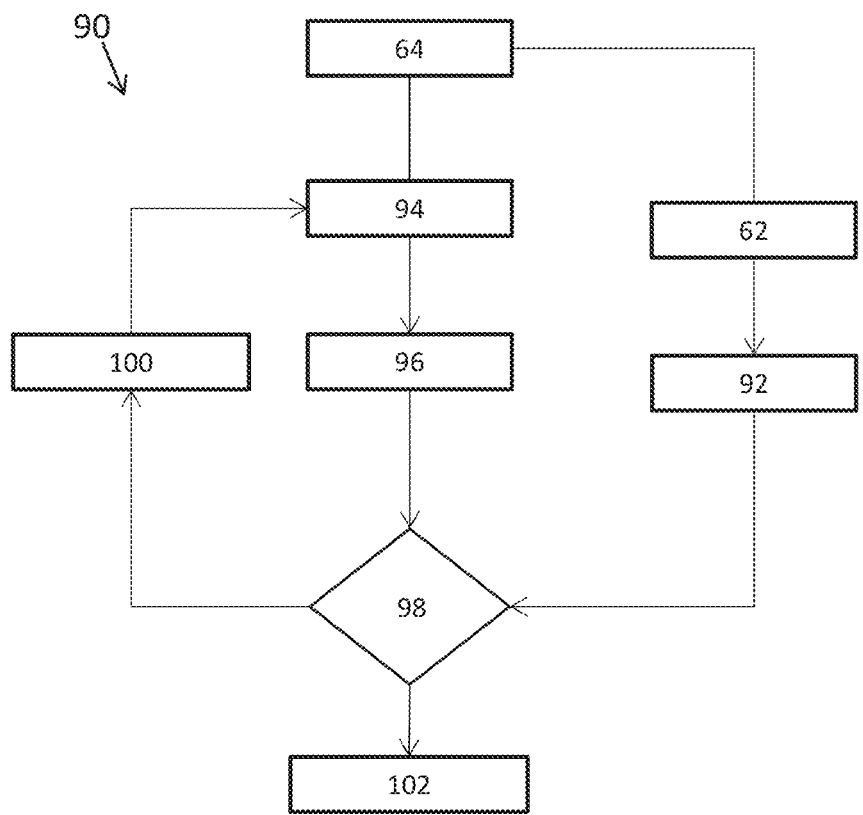
FIG. 17 depicts a method for determining a parameter according to an example of the present disclosure.

As depicted by FIG. 17, in an example reconstruction method 90 (which may be implemented using processor 64), such as CD reconstruction, pitch-walk reconstruction and/or reconstruction of at least one other parameter, may include:

measuring a distribution of a signal as scattered by the features on the substrate, e.g. by calculating a pupil image 92;

defining a mathematical (e.g. a geometrical shape) model 94 (e.g. such as model 68 or 70) of a feature such as a grating on a substrate W;

calculating 96 (e.g. integrating numerically) using Maxwell's equations an expected distribution of a signal as scattered by the model 94, e.g. to generate a calculated pupil image;

comparing 98 the calculated pupil image with a measured pupil image 92 (e.g. as obtained by measurement using the metrology apparatus 62); and varying the model, e.g. by varying at least one parameter 100 of the model influencing the expected pupil image (for example two or more parameters 100 defining the geometrical shape of the features). The above steps may be repeated until the estimated pupil image is similar within a tolerance to the measured pupil image, at which point the method 90 indicates that the model accurately describes the feature or features of the substrate W to reconstruct 102 the parameter of the device manufacturing process, e.g. pitch walk. It will be appreciated that different parameters may affect the pupil image in similar or different ways. For example, it may be possible for at least two different parameters to produce the same pupil image. In exemplary methods and apparatus disclosed herein, it may be impossible to differentiate the effect of one parameter of the features from another. In the example where pitch walk error is to be determined, methods and apparatus disclosed herein allow the effects of S1 and/or S2 on the pupil image to be determined independently. It will also be appreciated that the method 90 may implemented in various ways. For example, instead of measuring the pupil image 92, an image plane (image) may be measured (or indeed any image at any appropriate plane of the optical apparatus). The mathematical model 94, calculating 96 step and/or the comparing 98 step may be appropriately modified or adapted to reflect the plane of the optical apparatus that is being measured/calculated (e.g. due to the different intensity distribution profiles at each plane of the optical apparatus).

The present disclosure may provide a way to produce distinguishable pupil images (e.g. for each of the two parameters S1 and S2). By providing at least one feature of the substrate with a different dimension (e.g. the partially reduced height of lines 44' compared to lines 44 or the like), it may be possible to de-correlate, or calculate distinguishable pupil images and identify that e.g. pitch-walk is occurring in the features (in contrast to an error in the CD or another parameter). Conversely, the present disclosure may provide a way to determine that at least one parameter of the features is responsible for an error or that at least one parameter is not responsible for the error (e.g. to assist in the identification of the error). The method 90 may be at least partially implemented using at least part of the system 60 or using any other appropriate system.

Figure 18A:
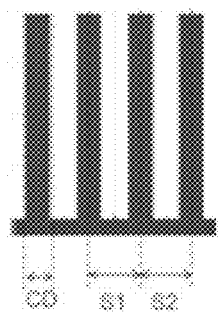
FIGS. 18a, 18b and 18c respectively illustrate: a cross-section view of a substrate W that is the same as FIG. 13a; and two set-get plots indicating an expected and simulated result for pitch-walk parameters using the system or method of FIG. 16a, FIG. 16b or FIG. 17.
Figure 18B:
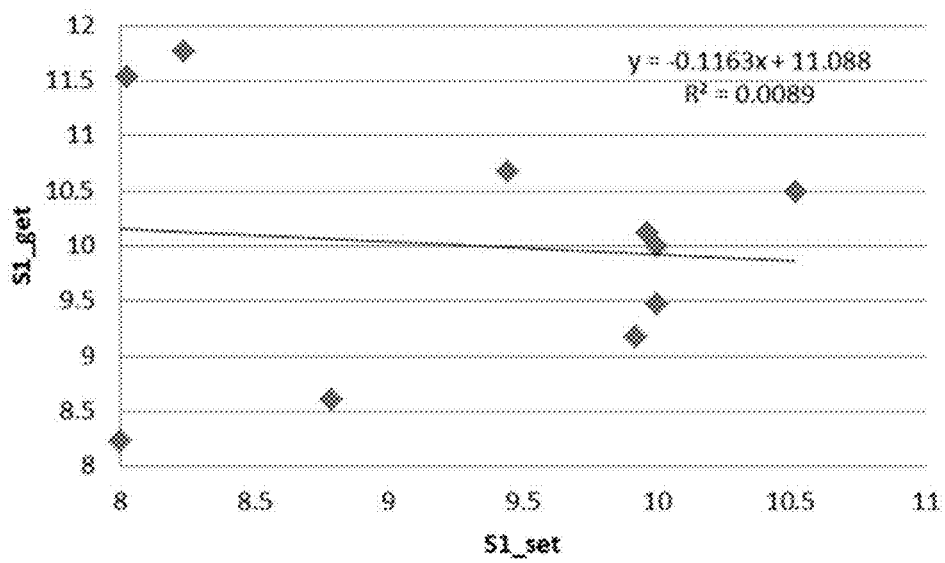
Figure 18C:
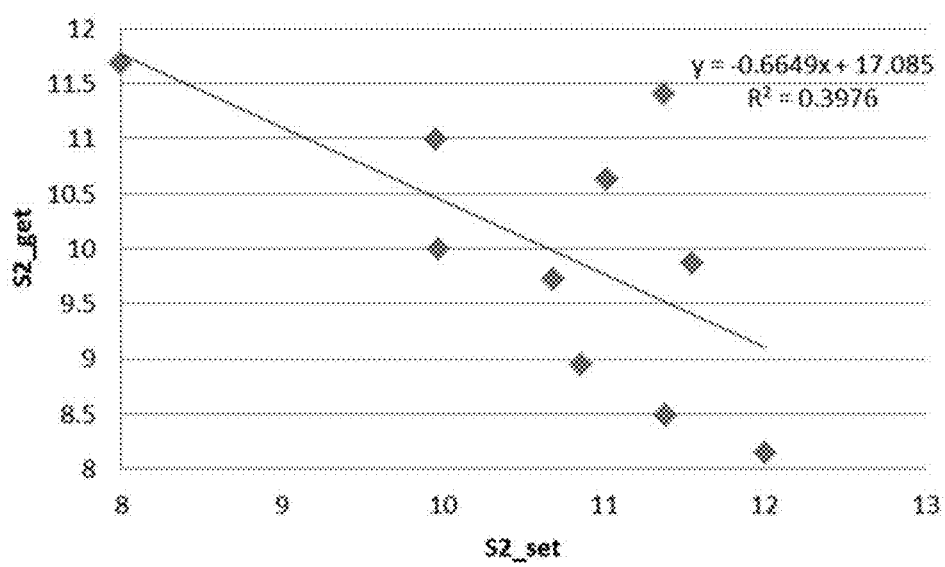

FIG. 18a corresponds to FIG. 13a, with no reduction in height of any of the lines 44. That is, the features in FIG. 18a include only second features 44. FIGS. 18b and 18c respectively depict two "set-get" plots showing a simulation of the expected parameter (e.g. an expected value for S1 and S2) vs. a simulated parameter (e.g. a simulated value for S1 and S2) for a substrate W including the features (e.g. a repeating unit cell) of FIG. 18a. The x-axis of the plots indicate a "set" value and the y-axis of the plots indicate a "get" value with both axes in nm. In this example, a real situation in a process is emulated by creating a random perturbation (of ±2 nm on S1, S2 and CD) in the geometry parameters (including pitch walk). The simulated signal is then processed e.g. as part of the system 60 or method 90 to assess whether there is enough signal to be able to determine the parameters S1 and S2, or pitch walk accurately. Using the structure illustrated by FIG. 18a, the plots of FIGS. 18b and 18c indicate that it is not possible to determine S1 and S2 as there is a poor $R^2$ correlation value between the expected and simulated results (i.e. y=−0.1163x+11.088; $R^2$=0.0089 for the S1 get-set plot and y=−0.6649x+17.085; $R^2$=0.3976 for the S2 get-set plot). The poor $R^2$ value indicates that a geometrical perturbation made to the model does not provide enough signal in the pupil response with the result that the S1 and S2 values cannot be inferred accurately.

Figure 19A:
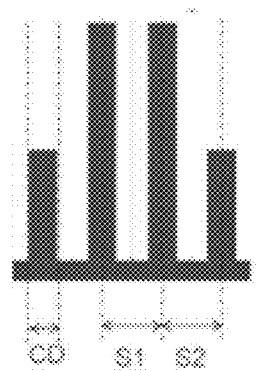
FIGS. 19a, 19b and 19c respectively illustrate: a cross-section view of a substrate W that is the same as FIG. 13b; and two set-get plots indicating an expected and simulated result for pitch-walk parameters using the system or method of FIG. 16a, FIG. 16b or FIG. 17.
Figure 19B:
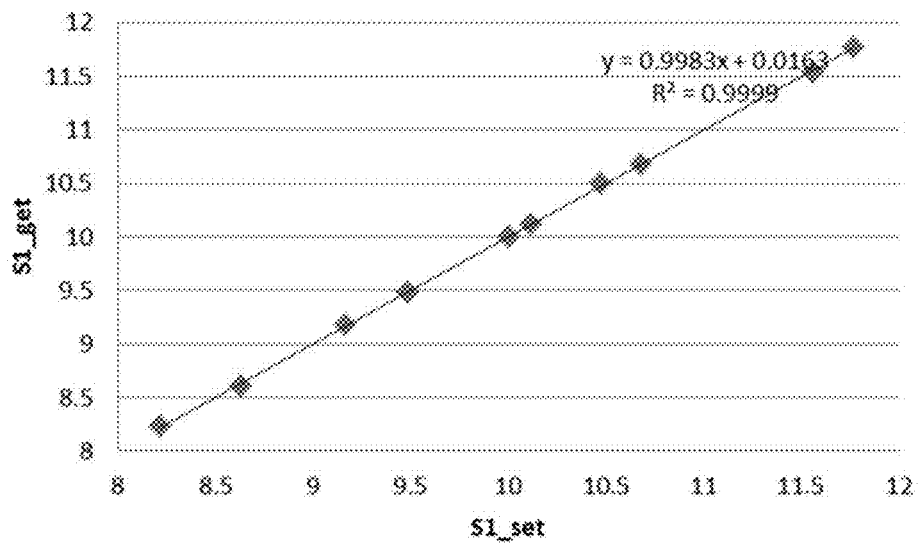
Figure 19C:
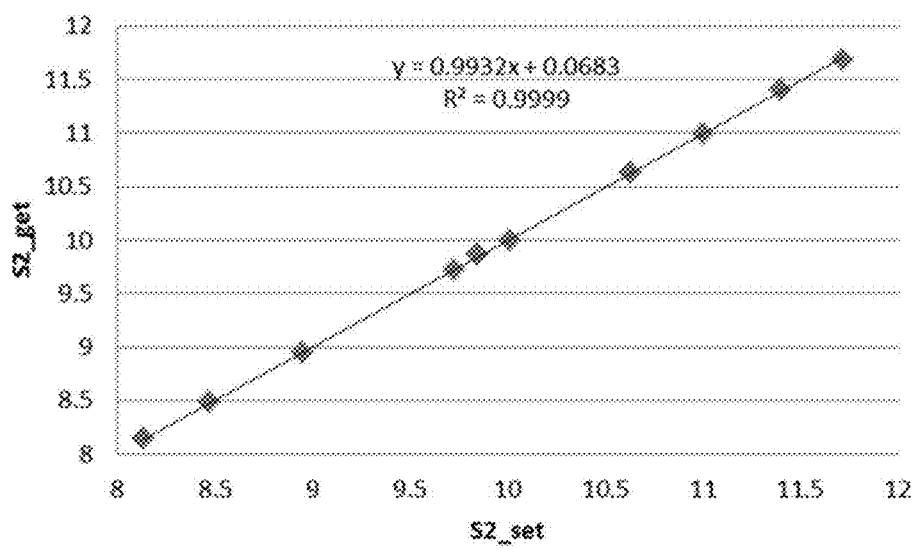

FIG. 19a, corresponds to FIG. 13b, with a reduction in height of the first features (or lines) 44'. In this example, two "set-get" plots are illustrated by FIGS. 19b and 19c (respectively corresponding to the expected/simulated parameters S1 and S2 for the structure illustrated by FIG. 19a). The same procedure is applied to calculate the "set-get" plots as in FIGS. 18b and 18c. However, in contrast, the set-get plots indicate that it is possible to determine S1 and S2 accurately as there is a very good $R^2$ correlation value between the expected and simulated results (i.e. y=0.9983x+0.0163; $R^2$=0.9999 for the S1 get-set plot and y=0.9932x+0.0683; $R^2$=0.9999 for the S2 get-set plot). Thus, the structure provided by FIG. 19a (and other similar structures) may enable the determination of S1 and S2, which might not otherwise be possible if using a structure such as shown by FIG. 18a.

Any of the methods disclosed may be implemented using any appropriately configured metrology apparatus. The metrology apparatus 62 of the present disclosure may comprise an optical apparatus as discussed above with reference to FIG. 3 and/or any other optical apparatus, for example, an ellipsometer or the like. A device manufacturing system comprising a device manufacturing apparatus and the metrology apparatus may be provided. The device manufacturing system may comprise a lithographic system comprising a lithographic apparatus LA and the metrology apparatus 62. The device manufacturing apparatus (e.g.

including at least the lithographic apparatus LA) may perform a device manufacturing process (e.g. a lithographic manufacturing process) on a substrate W. The metrology apparatus 62 may be configured to measure at least one parameter of the device manufacturing process. The device manufacturing apparatus may use the parameter measured by the metrology apparatus 62 in a subsequent device manufacturing process. Where the parameter represents an error in the device manufacturing process, the device manufacturing apparatus may use the parameter to reduce a size of the error or to indicate that an intervention needs to be made to rectify or reduce the size of the error.

Further embodiments according to the invention are described in below numbered clauses:

1. A substrate comprising a plurality of features for use in measuring a parameter of a device manufacturing process by illumination of the features with measurement radiation from an optical apparatus and detecting a signal arising from interaction between the measurement radiation and the features, wherein the plurality of features comprise first features distributed in a periodic fashion at a first pitch, and second features distributed in a periodic fashion at a second pitch, and wherein the first pitch and second pitch are such that a combined pitch of the first and second features is constant irrespective of the presence of pitch walk in the plurality of features.

2. The substrate of clause 1, wherein the first features have been fabricated using a spacer patterning method and wherein the combined pitch is a multiple of a width of a mandrel used in the spacer patterning method.

3. The substrate of clause 1 or clause 2, wherein the first and second features are spatially coincident in x and y dimensions of the substrate.

4. The substrate of any of clauses 1 to 3, wherein the first and second features are fabricated on separate layers formed in or patterned on the substrate.

5. The substrate of any of clauses 1 to 3, wherein the first and second features are fabricated on a single layer formed in or patterned on the substrate.

6. The substrate of clause 5, wherein one or more first features comprises a second feature, the height of which has been at least partially reduced.

7. The substrate of clause 6, wherein the first features have a reduced height compared to the second features over at least part of a length and/or width of the first features in x and y dimensions of the substrate, and wherein the height of the features is defined along a corresponding z-axis, normal to the substrate.

8. The substrate of clause 6 or clause 7, wherein a ratio of the height of the first features to the second features is 0.9 or less; 0.8 or less; 0.7 or less; 0.6 or less; or 0.5 or less.

9. The substrate of clause 8, wherein the ratio of the height of the first features to the second features is 0.1 or more; 0.2 or more; or 0.3 or more.

10. The substrate of any of clauses 6 to 9, wherein the first features have been formed by removal of at least part of one or more of the second features to reduce their height, or by depositing at least one layer on one or more of the second features to increase their height.

11. The substrate of any of clauses 6 to 10, wherein the first and second structures form a plurality of repeating periodic unit cell structures, each unit cell structure comprising at least one first feature and at least one second feature.

12. The substrate of clause 11, wherein the distribution of the at least one first and second features in the unit cell is such that the unit cell is symmetric.

13. The substrate of clause 11 or clause 12, wherein the unit cell has a width and/or length that is less than 150 nm; less than 100 nm; less than 80 nm; less than 60 nm; or less than 40 nm.

14. The substrate of any of clauses 1 to 13, wherein the first and second features are arranged such that a signal comprising specular reflected radiation arising from interaction between the measurement radiation and the first and second features comprises $0^{th}$ diffraction order and is measureable using the optical apparatus to determine the parameter of the device manufacturing process.

15. The substrate of any of clauses 1 to 14, wherein the first and second features are arranged such that a pitch walk error of the first and/or second features produces distinguishable pupil images in the pupil plane.

16. The substrate of any of clauses 1 to 15, wherein the first and second features comprise lines fabricated in or patterned on the substrate by the device manufacturing process.

17. The substrate of any of clauses 1 to 16, wherein the first pitch is greater than the second pitch and is optionally a multiple of the second pitch.

18. The substrate of any of clauses 1 to 17, wherein the second pitch is less than 100 nm; less than 80 nm; less than 60 nm; less than 40 nm; less than 20 nm; or less than 10 nm.

19. A substrate comprising a plurality of features for use in measuring a parameter of a device manufacturing process by illumination of the features with measurement radiation from an optical apparatus and detecting a signal arising from interaction between the measurement radiation and the plurality of features, wherein the plurality of features are distributed in a periodic fashion defining a common pitch of less than 100 nm between adjacent features, and wherein one or more first features of the plurality of features has an at least partially reduced height compared to one or more second features of the plurality of features.

20. A metrology apparatus for measuring a parameter of a device manufacturing process based on information acquired by an optical apparatus, the optical apparatus configured to illuminate a plurality of features of a substrate with measurement radiation and to detect a signal comprising specular reflected radiation arising from interaction between the measurement radiation and the plurality of features by measuring the signal using the optical apparatus, wherein the plurality of features comprise first features distributed in a periodic fashion at a first pitch, and second features distributed in a periodic fashion at a second pitch, and wherein the first pitch and second pitch are such that a combined pitch of the first and second features is constant irrespective of the presence of pitch walk in the plurality of features, the metrology apparatus comprising:

a processor configured to:

determine an expected distribution of the specular reflected radiation, based on a model;

compare a measured distribution of the specular reflected radiation with the determined expected distribution of the specular reflected radiation to determine an error therebetween; and if the error is below a threshold, determine the parameter to be a parameter associated with the model; or if the error is above a threshold, update the model.

21. The metrology apparatus of clause 20, wherein the measured distribution of the specular reflected radiation is measured in the pupil plane.

22. The metrology apparatus of clause 20 or clause 21, wherein the specular reflected radiation comprises 0th order diffracted radiation.

23. A method of measuring a parameter of a device manufacturing process based on information acquired by an optical apparatus, the optical apparatus configured to illuminate a plurality of features of a substrate with measurement radiation and to detect a signal comprising specular reflected radiation arising from interaction between the measurement radiation and the plurality of features by measuring the signal using the optical apparatus, wherein the plurality of features comprise first features distributed in a periodic fashion at a first pitch, and second features distributed in a periodic fashion at a second pitch, and wherein the first pitch and second pitch are such that a combined pitch of the first and second features is constant irrespective of the presence of pitch walk in the plurality of features, the method comprising:

determining an expected distribution of the specular reflected radiation, based on a model;

comparing a measured distribution of the specular reflected radiation with the determined expected distribution of the specular reflected radiation to determine an error therebetween; and if the error is below a threshold, determining the parameter to be a parameter associated with the model; or if the error is above a threshold, updating the model.

24. A computer program comprising instructions which, when executed on at least one processor, cause the at least one processor to control an apparatus to carry out the method according to clause 23.

25. A carrier containing the computer program of clause 24, wherein the carrier is one of an electronic signal, optical signal, radio signal, or non-transitory computer readable storage medium.

Although specific reference may have been made above to the use of examples of the present disclosure in the context of optical lithography, it will be appreciated that the present disclosure may be used in other applications, for example imprint lithography, and where the context allows, is not limited to optical lithography. In imprint lithography a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

The terms "radiation" and "beam" used herein encompass all types of electromagnetic radiation, including ultraviolet (UV) radiation (e.g., having a wavelength of or about 365, 355, 248, 193, 157 or 126 nm) and extreme ultra-violet (EUV) radiation (e.g., having a wavelength in the range of 5-20 nm), soft X-ray, as well as particle beams, such as ion beams or electron beams.

The term "lens," where the context allows, may refer to any one or combination of various types of optical components, including refractive, reflective, magnetic, electromagnetic, and electrostatic optical components.

The foregoing description of the examples will so fully reveal the general nature of the present disclosure that others can, by applying knowledge within the skill of the art, readily modify and/or adapt for various applications such specific examples, without undue experimentation, without departing from the scope of the present disclosure. Therefore, such adaptations and modifications are intended to be within the meaning and range of equivalents of the disclosed examples, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The invention claimed is:

1. A substrate comprising a plurality of features for use in measuring a parameter of a device manufacturing process by illumination of the features with measurement radiation from an optical apparatus and detecting a signal arising from interaction between the measurement radiation and the features, wherein the plurality of features comprise first features distributed in a periodic fashion at a first pitch, and second features distributed in a periodic fashion at a second pitch, and wherein the first pitch and second pitch are such that a combined pitch of the first and second features is essentially constant irrespective of the presence of pitch walk in the plurality of features.

2. The substrate of claim 1, wherein the first features have been fabricated using a spacer patterning method and the combined pitch is a multiple of a width of a mandrel used in the spacer patterning method.

3. The substrate of claim 1, wherein the first and second features are spatially coincident in x and y dimensions of the substrate.

4. The substrate of claim 1, wherein the first and second features are fabricated on separate layers formed in or patterned on the substrate.

5. The substrate of claim 1, wherein the first and second features are fabricated on a single layer formed in, or patterned on, the substrate.

6. The substrate of claim 5, wherein one or more first features comprises a second feature, the height of which has been at least partially reduced.

7. The substrate of claim 6, wherein the first features have a reduced height compared to the second features over at least part of a length and/or width of the first features in x and y dimensions of the substrate, the height of the features is defined along a corresponding z-axis, normal to the substrate.

8. The substrate of claim 6, wherein a ratio of the height of the first features to the second features is 0.9 or less.

9. The substrate of claim 8, wherein the ratio of the height of the first features to the second features is 0.1 or more.

10. The substrate of claim 6, wherein the first features have been formed by:

removal of at least part of one or more of the second features to reduce their height, or by depositing at least one layer on one or more of the second features to increase their height.

11. The substrate of claim 6, wherein the first and second structures form a plurality of repeating periodic unit cell structures, each unit cell structure comprising at least one first feature and at least one second feature.

12. The substrate of claim 11, wherein the distribution of the at least one first and second features in each unit cell structure is such that the unit cell structure is symmetric.

13. The substrate of claim 11, wherein the unit cell structure has a width and/or length that is less than 150 nm.

14. The substrate of claim 1, wherein the first and second features are arranged such that a signal comprising specular reflected radiation arising from interaction between the measurement radiation and the first and second features comprises $0^{th}$ diffraction order and is measureable using the optical apparatus to determine the parameter of the device manufacturing process.

15. The substrate of claim 1, wherein the first and second features are arranged such that a pitch walk error of the first and/or second features produces distinguishable pupil images in the pupil plane.

16. A substrate comprising a plurality of features for use in measuring a parameter of a device manufacturing process by illumination of the features with measurement radiation from an optical apparatus and detecting a signal arising from interaction between the measurement radiation and the features,
  wherein the plurality of features comprise first features distributed in a periodic fashion at a first pitch, and second features distributed in a periodic fashion at a second pitch different from the first pitch, the second features interspersed among first features, and
  wherein a combined pitch of the first and second features is essentially constant irrespective of the presence of pitch walk in the plurality of features.

17. The substrate of claim 16, wherein one or more first features comprises a second feature, the height of which has been at least partially reduced.

18. The substrate of claim 16, wherein the first features have a reduced height compared to the second features over at least part of a length and/or width of the first features in x and y dimensions of the substrate, the height of the features is defined along a corresponding z-axis, normal to the substrate.

19. The substrate of claim 16, wherein the first and second structures form a plurality of repeating periodic unit cell structures, each unit cell structure comprising at least one first feature and at least one second feature and the distribution of the at least one first and second features in each unit cell structure is such that the unit cell structure is symmetric.

20. The substrate of claim 19, wherein the unit cell structure has a width and/or length that is less than 150 nm.

* * * * *